United States Patent [19]
Gottlieb

[11] 3,821,694
[45] June 28, 1974

[54] BATTERY TERMINAL AND CABLE CONNECTOR

[75] Inventor: Robert G. Gottlieb, Prairie Village, Kans.

[73] Assignee: Lewis Industries, Inc., Kansas City, Mo.

[22] Filed: Oct. 6, 1972

[21] Appl. No.: 295,498

[52] U.S. Cl. ............................................. 339/232
[51] Int. Cl. ........................................... H01r 11/26
[58] Field of Search ......................... 339/224–240, 339/263, 272

[56] References Cited
UNITED STATES PATENTS
625,668  5/1899  Gilliland .................... 339/272 R
1,869,524  8/1932  Taylor ........................... 339/232
2,278,307  3/1942  Eisler, Jr. ....................... 339/237
3,595,701  7/1971  Lewis et al. .................. 339/278 R FOREIGN PATENTS OR APPLICATIONS
25,259  8/1908  Sweden .......................... 339/272 R Primary Examiner—Joseph H. McGlynn

[57] ABSTRACT

A battery terminal has a tapered body with an axially projecting threaded mounting stud and an integral wrench hex grasping ring. A wire receiving hole projects transversely through the body and an exial threaded bore carries a clamping bolt extending into the hole.

5 Claims, 4 Drawing Figures

PATENTED JUN 28 1974 3,821,694
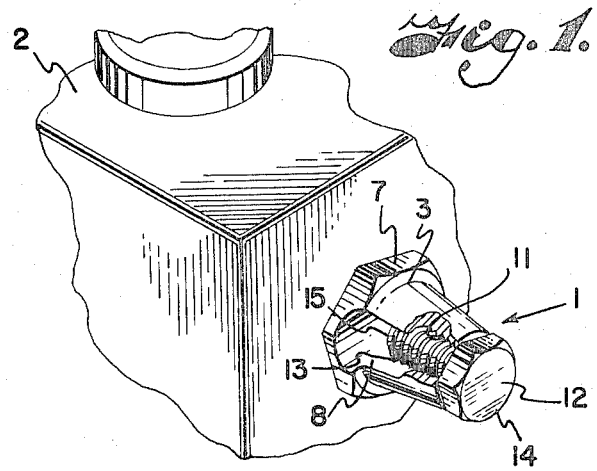
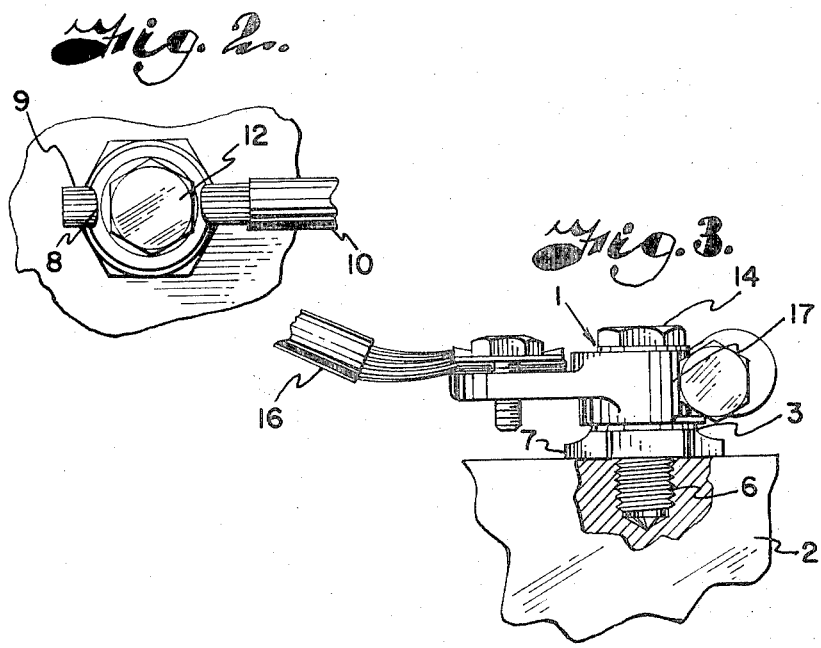
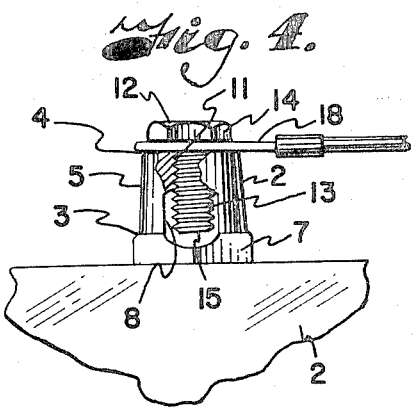

BATTERY TERMINAL AND CABLE CONNECTOR

This invention relates to improvements in battery terminals and more particularly, to such terminals which may also serve as connectors for various cable terminations.

Automotive batteries and the like for many years utilized tapered post terminals, normally of lead, which were integral extensions of internal battery plate assemblies. For electrical operation, post clamps located at the ends of electrical cables were secured to the terminals. More recently, so-called "side mount" terminals have been utilized on automotive batteries, consisting of embedded metal receivers containing threaded bores opening to the surface of a battery side wall. In operation, tapered post terminals having threaded studs may be screwed into the side wall and conventional post-receiving cable clamps utilized to make the connection in the usual manner. In the alternative, cable eyelet terminations may be connected to the battery by means of conventional bolts screwed into the receiver. However, in neither case can a suitable connection be made between the cable and the side mount battery unless the cable terminates in a suitable clamping or connecting device.

The above noted situation often presents an awkward and confusing problem to automobile owners, repairmen, and the like attempting to replace a battery or battery cable, especially under emergency conditions. This invention permits the proper connection of electrical cables to side mount type battery terminals regardless of cable termination, including a bare wire bundle.

The principal objects of the present invention are: to provide a cable connector or terminal for batteries and the like which may be alternately connected to a cable terminus of bare wire, conventional tapered post clamp or cable eyelet anchor; to provide such a terminal which is easily and quickly secured to modern side mount batteries through the use of a standard spark plug wrench or the like; to provide such a device which may be constructed of various electrically conductive materials including lead and brass; and to provide such a device which is simple and inexpensive in construction and yet highly reliable and functional for its intended purpose.

Other objects and advantages of this invention will become apparent from the following description taken in connection with the accompanying drawings wherein are set forth by way of illustration and example certain embodiments of this invention.

FIG. 1 is a fragmentary perspective view showing schematically a small portion of a side mount battery with a terminal embodying this invention secured thereto, a portion of the terminal being broken away to illustrate interior construction.

FIG. 2 is a fragmentary plan view showing the terminal of FIG. 1 with a bare wire bundle from a cable secured directly thereinto.

FIG. 3 is a further fragmentary view showing the terminal engaged by one type of conventional cable clamp.

FIG. 4 is a view similar to FIG. 3 but showing one type of cable eyelet connector secured to the terminal.

Referring to the drawings in more detail:

The reference numeral 1 generally indicates a battery terminal embodying this invention. The terminal 1 is shown mounted on a side mount battery 2 of conventional configuration, it being understood that such terminals are normally mounted on the battery in spaced apart pairs.

The terminal comprises a post 2 of a suitable electrically conductive material, such as brass or lead, the post having a larger base end portion 3 and a smaller free end portion 4. A tapered frusto-conical body 5 extends between the base and free end portions 3 and 4 forming a tapered surface of a configuration and size similar to that of conventional tapered post battery terminals.

The base end portion 3 includes a battery receiving threaded mounting stud 6 projecting axially away from the post 2, FIG. 3, and an integral wrench hex grasping ring 7 surrounding the post adjacent the threaded stud 6 for aid in securing and removing the device. It is to be understood that, should the battery terminal be constructed of a relatively hard material such as brass, the threaded stud 6 may be formed integrally therewith, however, if a relatively soft material such as lead is used, the stud 6 should be of a harder material, such as brass, with a suitable anchor portion (not shown) imbedded within the post 2.

A hole 8 extends transversely through the post body between the base and free end portions 3 and 4, and is of sufficient size to accommodate a bundle 9 of bare metallic strands forming the termination of a conventional battery cable 10, FIG. 2.

A threaded bore 11 extends axially into the body 5 from the free end portion 4 and communicates with the transverse hole 8 as best shown in FIG. 4. A bolt 12 has a shank 13 threadedly received into the bore 11 and a head 14 which is smaller in maximum diameter than the diameter of the body 5 at the free end portion 4. The shank 13 is of a sufficient length so that the free end 15 thereof extends a substantial distance into the hole 8 when the bolt head 14 is positioned near the free end portion 4. Referring to FIG. 2, with the wire bundle 9 extending through the hole 8, the bolt 12 may be rotated, thereby clamping the bundle within the post 2 and making a secure electrical connection therewith.

Referring to FIG. 3, if a cable 16 terminates in any one of several common automotive battery cable clamps of the type adapted for securing to a tapered battery post, in this example clamp 17, the connection to the battery terminal 1 may be easily accomplished in the usual manner. That is, the clamp 17 is fitted over the bolt head 14, since the bolt head is slightly smaller than the diameter of a post free end portion 4, and secured to the post. The bolt head 14 remains available, if desired, for securing a suitable cable eyelet such as that described below in connection with FIG. 4, in addition to the clamp 17.

Referring to FIG. 4, in the alternative or in combination with the above noted connecting arrangements, a cable eyelet 18 of suitable size may be secured to the post 2 through clamping by means of the bolt 12.

The battery terminal of this invention, as described above, is easily and conveniently utilized in several alternative and combination connecting arrangements, thus making it a generally universal device for battery terminal connection regardless of the cable termination at hand.

It is to be understood that while certain forms of this invention have been illustrated and described, it is not to be limited thereto except insofar as such limitations are included in the following claims.

What I claim and desire to secure by Letters Patent is:

1. An automotive storage battery terminal adapted for selective connection to a bare cable and an eyelet anchor and a tapered post clamp comprising:
   a. a post of electrically conductive material, said post having a larger base end portion and a smaller free end portion and a tapered frusto-conical body extending therebetween; a threaded battery terminal mounting stud projecting axially away from said post at said larger base end portion;
   b. a hole extending transversely into said post body between said base and free end portions and adapted to receive an automotive battery cable thereinto;
   c. a threaded bore extending into said body from said free end portion and communicating with said transverse hole; and
   d. a screw member threadedly received into said bore, said screw member having a head and a shank, said shank having a length permitting said shank to adjustably extend transversely into said hole to a position spaced from the base end wall of said hole when said head is adjacent said free end portion of said post.

2. The terminal as set forth in claim 1 including:
   a. an integral wrench box grasping ring surrounding said post adjacent said threaded stud.

3. The terminal as set forth in claim 1 wherein:
   a. said hole extends transversely through said post body.

4. The terminal as set forth in claim 1 wherein:
   a. said threaded bore extends axially into said body.

5. The terminal as set forth in claim 1 wherein:
   a. said screw member comprises a bolt threadedly received into said bore, said bolt having a head smaller in maximum diameter than the diameter of said body at said free end portion.

* * * * *